(12) United States Patent
Hagstrand et al.

(10) Patent No.: US 11,613,633 B2
(45) Date of Patent: Mar. 28, 2023

(54) POLYMER COMPOSITION FOR WIRE AND CABLE APPLICATIONS WITH ADVANTAGEOUS THERMOMECHANICAL BEHAVIOUR AND ELECTRICAL PROPERTIES

(71) Applicant: BOREALIS AG, Vienna (AT)

(72) Inventors: Per-Ola Hagstrand, Stenungsund (SE); Thomas Gkourmpis, Gothenburg (SE); Antonios Gitsas, Linz (AT); Mattias Andersson, Gothenburg (SE); Christian Müller, Gothenburg (SE)

(73) Assignee: Borealis AG, Vienna (AT)

( * ) Notice: Subject to any disclaimer, the term of this patent is extended or adjusted under 35 U.S.C. 154(b) by 63 days.

(21) Appl. No.: 16/312,396

(22) PCT Filed: Jun. 20, 2017

(86) PCT No.: PCT/EP2017/065143
§ 371 (c)(1),
(2) Date: Dec. 21, 2018

(87) PCT Pub. No.: WO2017/220616
PCT Pub. Date: Dec. 28, 2017

(65) Prior Publication Data
US 2019/0233627 A1 Aug. 1, 2019

(30) Foreign Application Priority Data

Jun. 21, 2016 (EP) .................................... 16175581
Jun. 21, 2016 (EP) .................................... 16175582

(51) Int. Cl.
| C08L 23/06 | (2006.01) |
| H01B 3/44 | (2006.01) |
| H01B 3/30 | (2006.01) |
| H01B 13/14 | (2006.01) |
| C08L 23/04 | (2006.01) |

(52) U.S. Cl.
CPC .............. *C08L 23/06* (2013.01); *C08L 23/04* (2013.01); *H01B 3/301* (2013.01); *H01B 3/441* (2013.01); *H01B 13/14* (2013.01); *C08L 2203/202* (2013.01); *C08L 2207/066* (2013.01)

(58) Field of Classification Search
None
See application file for complete search history.

(56) References Cited

U.S. PATENT DOCUMENTS

| 4,260,661 A | 4/1981 | Walters et al. |
| 4,693,937 A | 9/1987 | Wu et al. |
| 4,797,323 A | 1/1989 | Wu et al. |
| 4,824,883 A | 4/1989 | Walter et al. |
| 5,036,034 A | 7/1991 | Ewen |
| 5,929,137 A * | 7/1999 | Marsac .................... C08J 3/005 523/205 |
| 6,326,422 B1 | 12/2001 | Horwatt |
| 6,605,657 B1 * | 8/2003 | Favis ....................... C08J 3/005 524/388 |
| 7,943,063 B2 * | 5/2011 | Lucht ..................... G01K 11/16 252/408.1 |
| 8,518,738 B2 * | 8/2013 | Sirringhaus ......... H01L 51/0012 438/99 |
| 9,249,271 B2 | 2/2016 | Low |
| 9,404,005 B2 | 8/2016 | Sutton et al. |
| 9,666,334 B2 * | 5/2017 | Josefsson ................ H01B 1/22 |
| 10,208,196 B2 | 2/2019 | Nilsson et al. |
| 2010/0163269 A1 | 7/2010 | Perego et al. |
| 2010/0163273 A1 | 7/2010 | Smedberg |
| 2010/0193217 A1 | 8/2010 | Laurenson et al. |
| 2010/0206607 A1 | 8/2010 | Noyens et al. |
| 2012/0273253 A1 | 11/2012 | Nilsson et al. |
| 2013/0032376 A1 | 2/2013 | Fagrell et al. |
| 2013/0037759 A1 | 2/2013 | Svanberg et al. |
| 2013/0081854 A1 | 4/2013 | Englund et al. |
| 2013/0164552 A1 | 6/2013 | Wang |
| 2013/0175068 A1 | 7/2013 | Sutton et al. |
| 2013/0175070 A1 | 7/2013 | Person et al. |
| 2013/0186670 A1 | 7/2013 | Person |
| 2013/0199817 A1 | 8/2013 | Nilsson et al. |
| 2013/0260624 A1 | 10/2013 | Rastogi et al. |
| 2013/0284486 A1 | 10/2013 | Nilsson et al. |
| 2014/0377577 A1 | 12/2014 | Lee et al. |
| 2014/0378602 A1 | 12/2014 | Walther et al. |
| 2015/0159069 A1 | 6/2015 | Ranganathan et al. |
| 2015/0228376 A1 | 8/2015 | Ranganathan et al. |

(Continued)

FOREIGN PATENT DOCUMENTS

| CN | 101824199 | 9/2010 |
| CN | 105061859 | 11/2015 |

(Continued)

OTHER PUBLICATIONS

English abstract of CN 105061859, Nov. 18, 2015, China, 6 pages.*
2 page brochure for Polythiophene, CAS. No. 25233-34-5 by LookChem.com, Downloaded on Jul. 26, 2021.*
Xu Changqing, Handbook of Synthetic Resins and Plastics, Chemical Industry Press, Beijing, Nov. 1991, pp. 18-20 and its English Language Translation.
Office Action issued in co-pending U.S. Appl. No. 16/311,494, dated Apr. 3, 2020.
China petrochemical product manual, Liu Bingyi, P344, China petrochemical press; Mar. 2000 and translation.
International Search report and Written Opinion issued for Application No. PCT/EP2017/065148, dated Aug. 28, 2017, 12 pages.
International Search report and Written Opinion issued for Application No. PCT/EP2017/065133, dated Sep. 4, 2017, 13 pages.

(Continued)

*Primary Examiner* — Tae H Yoon
(74) *Attorney, Agent, or Firm* — Meunier Carlin & Curfman LLC

(57) ABSTRACT

The invention provides a polymer composition comprising a) a low density polyethylene (LDPE); and b) a conjugated aromatic polymer. The invention also relates to cables comprising said polymer composition and the use of the polymer composition in the manufacture of an insulation layer of cable.

10 Claims, 2 Drawing Sheets

(56) References Cited

U.S. PATENT DOCUMENTS

| | | |
|---|---|---|
| 2015/0294755 A1 | 10/2015 | Zhou et al. |
| 2015/0307679 A1 | 10/2015 | Lee |
| 2015/0315401 A1 | 11/2015 | Lee |
| 2016/0194489 A1 | 7/2016 | Ho et al. |
| 2016/0199906 A1 | 9/2016 | Walton et al. |
| 2016/0311998 A1 | 10/2016 | Uematsu et al. |
| 2017/0169920 A1 | 6/2017 | Liu et al. |
| 2017/0327675 A1 | 11/2017 | Englund et al. |
| 2017/0365378 A1 | 12/2017 | Kaga et al. |
| 2019/0348191 A1* | 11/2019 | Hagstrand ............ B29C 48/022 |

FOREIGN PATENT DOCUMENTS

| | | | |
|---|---|---|---|
| CN | 105440395 | | 3/2016 |
| EP | 0129368 | | 12/1984 |
| EP | 0260130 | | 3/1988 |
| EP | 0423101 | | 4/1991 |
| EP | 0537130 | | 4/1993 |
| EP | 0517868 | | 11/1995 |
| EP | 2553015 | | 2/2013 |
| FR | 2905699 A1 | | 3/2008 |
| JP | 0218811 | | 1/1990 |
| JP | H05266723 | | 10/1993 |
| JP | 2003308740 | | 10/2003 |
| KR | 20110054916 A | * | 5/2011 |
| WO | 9308222 | | 4/1993 |
| WO | WO 94/02530 | * | 2/1994 |
| WO | 9613529 | | 5/1996 |
| WO | 9728170 | | 8/1997 |
| WO | 9846616 | | 10/1998 |
| WO | 9849208 | | 11/1998 |
| WO | 9856831 | | 12/1998 |
| WO | 9912981 | | 3/1999 |
| WO | 9919335 | | 4/1999 |
| WO | 9920685 A1 | | 4/1999 |
| WO | 99/57190 | | 11/1999 |
| WO | 0034341 | | 6/2000 |
| WO | 03/051934 | | 6/2003 |
| WO | 2011/113685 | | 9/2011 |
| WO | 2011/113686 | | 9/2011 |
| WO | 2011128147 | | 10/2011 |
| WO | 2012044523 | | 4/2012 |
| WO | 2013060736 | | 5/2013 |
| WO | 2014075727 | | 5/2014 |
| WO | 2015090640 | | 6/2015 |
| WO | 2016066619 | | 5/2016 |

OTHER PUBLICATIONS

International Search report and Written Opinion issued for Application No. PCT/EP2017/065134, dated Aug. 23, 2017, 14 pages.

Database WPI Week 199347 Thomas Scientific, London, GB, AN 1993-371305 XP002764002, 1993.

Database WPI Week 200420 Thomas Scientific, London, GB, AN 2004-206790 XP002764003, 2004.

Office Action issued in co-pending U.S. Appl. No. 16/311,497, dated Sep. 11, 2019.

Office Action issued in co-pending U.S. Appl. No. 16/311,494, dated Sep. 25, 2019.

Parker, J. A., et al. "On high pressure crystallization and the characterization of linear low-density polyethylenes." Polymer 35.19 (1994): 4140-4145.

Encyclopedia of Polymer Science and Engineering vol. 6 1986 pp. 383-410.

Rklimesch Dlittmann Fo Mahling Encyclopedia of Materials Science and Technology 2001 Elsevier Science Ltd article Polyethylene High-pressure pp. 7181-7184.

J. Randall JMS—Rev. Macromol. Chem. Phys., C29(2&3), 201-317 (1989).

Olsson, Carl-Olof, et al. "Experimental Determination of DC conductivity for XLPE Insulation." Nordic Insul. Symp.(NORD-IS 09). 2009, 55-58.

International Search report and Written Opinion issued for Application No. PCT/EP2017/065143, dated Nov. 20, 2017, 15 pages.

Zhang et al., "Dynamic mechanical properties of melt processable PANI-DBSA/LDPE Blends", Synthetic Metals, vol. 135-136, pp. 481-482, 2003.

Zhang et al., "Electrically conductive, melt-processed ternary blends of polyaniline/dodecylbenzene sulfonic acid, ethylene/vinyl acetate, and low-density polyethylene", Journal of Polymer Science Part B: Polymer Physics, 42(20): 3750-3758, 2004.

Annala, et al., "Compatibilization of Conductive Polyethylene/Polyaniline Blends", Macromol. Mater. Eng., 291(7): 848-857, 2006. doi:10.1002/mame.200600071.

Cote, et al., "PANI-LDPE composites: Effect of blending conditions", Polym Compos, 30(1): 22-28, 2008. doi:10.1002/pc.20523.

Non-final Office Action dated Jan. 19, 2021 in U.S. Appl. No. 16/311,500 (6 pages).

* cited by examiner

POLYMER COMPOSITION FOR WIRE AND CABLE APPLICATIONS WITH ADVANTAGEOUS THERMOMECHANICAL BEHAVIOUR AND ELECTRICAL PROPERTIES

CROSS REFERENCE TO RELATED APPLICATIONS

This application is a National Phase Application of PCT/EP2017/065143, filed Jun. 20, 2017, which claims priority to European Application Nos. 16175582.2 filed Jun. 21, 2016 and 16175581.4 filed Jun. 21, 2016, each of which are incorporated by reference herein in their entirety.

FIELD OF INVENTION

The invention relates to a polymer composition which may be used for producing an insulation layer of cable, such as a direct current (DC) power cable. In particular, the invention relates to a polymer composition which is a blend of an LDPE and a conjugated aromatic polymer, which has surprisingly high thermomechanical resistance and low electrical conductivity. In one embodiment, the polymer composition of the invention is used in non-crosslinked form thus avoiding the need for a crosslinking agent to be present and avoiding the need for post crosslinking and degassing procedures to remove crosslinking agent by-products. In another embodiment, the polymer composition is optionally crosslinkable and can thus be subsequently crosslinked.

The invention also relates to a cable, e.g. a direct current (DC) power cable, comprising the polymer composition in at least the insulation layer, as well as to a preparation process of the cable.

BACKGROUND

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition have significant importance.

The electrical properties of importance may differ in different cable applications, as is the case between alternating current (AC) and direct current (DC) cable applications.

Furthermore, the mechanical properties of the polymer composition, in particular when subjected to heat in cable applications, are of particular significance. In HV DC cables, the insulation is heated by the leakage current. For a specific cable design the heating is proportional to the insulation conductivity×(electrical field)$^2$. Thus, if the voltage is increased, far more heat will be generated. It is important that the mechanical properties, such as creep, of the polymer do not significantly deteriorate in the presence of this heat.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often crosslinked to improve e.g. heat and deformation resistance, creep properties, mechanical strength, chemical resistance and abrasion resistance of the polymer in the layer(s) of the cable. During a crosslinking reaction, crosslinks (bridges) are primarily formed. Crosslinking can be effected using, for example, a free radical generating compound which is typically incorporated in to the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. The resulting decomposition products of peroxides may include volatile by-products which are often undesired, since they may have a negative influence on the electrical properties of the cable. Therefore the volatile decomposition products such as methane are conventionally reduced to a minimum or removed after crosslinking and cooling step. Such a removal step, generally known as a degassing step, is time and energy consuming causing extra costs.

Cross-linked high pressure LDPE has been used for extruded HVDC cables for about 15 years. The latest products developed are approved for 525 kV cables. The industry however is demanding even higher voltages. With such higher voltages comes the challenge of developing materials which can withstand the heat generated within the cables and which show good temperature resistance in terms of their mechanical properties. In order to reach even higher voltage levels, insulation materials with even lower electrical conductivity will also be needed to prevent thermal runaway.

The DC electrical conductivity is thus an important material property for insulating materials, in particular those designed for use in high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

There are high demands to increase the voltage of a power cable, particularly of a direct current (DC) power cable, and thus a continuous need to find alternative polymer compositions which have the necessary mechanical properties required for demanding power cable applications and, more importantly, which can maintain these properties when subjected to the heat generated within the cable. Also required is a polymer composition with reduced conductivity.

Our invention seeks to optimise the thermomechanical resistance of the polymer composition, optionally whilst avoiding the problems associated with crosslinking and subsequent degassing. One solution is that compositions comprising a mixture of an LDPE with a conjugated aromatic polymer offers remarkably good thermomechanical behaviour even without crosslinking.

It is desirable if low conductivity insulation layer materials can be formed from LDPE as opposed to polymers made at low pressure using conventional organometallic catalysis. LDPE tends to be a "cleaner" polymer and any impurities are a significant problem within an insulation layer as these lead to defects and higher conductivity. As voltages increase, the problem of impurities is exacerbated and hence LDPE is therefore the ideal base material for insulation layers for cables and is favoured over polymers made in low pressures processes such as LLDPE. A problem with LDPE is, however, that the temperature resistance, when used in HVDC cables, is often not adequate and deterioration of the material is seen over time. Thus, to find LDPE materials with improved thermomechanical properties compared to those used today, would be of great value.

Previous studies have demonstrated that blending LDPE with different polymers can lead to attractive conductivity properties.

JP2018811A discloses an insulation layer for a DC cable which contains a blend of 2-20 wt % of a high density polyethylene with a low density polyethylene. It is stated that blend provides improved DC breakdown and an impulse property. The blend is mixed with 2-3 wt % of a crosslinking agent. The type and layer structure of the cable has not been specified.

WO 2011/113686 reports lower conductivities for blends of an LDPE with an HDPE compared with pure LDPE.

The inventors have now found that polymer compositions comprising a blend of an LDPE with a conjugated aromatic polymer, such as a polythiophene, offers remarkably high thermomechanical resistance and remarkably low conductivity. In particular, we have found that the blends of the invention do not suffer from creep and hence we demonstrate that the blends of the invention can be used in cable layers. The polymer compositions can be used to prepare, for example, the insulation layer in a direct current (DC) power cable, offering cables which can operate at voltages higher than possible today.

SUMMARY OF INVENTION

Thus viewed from one aspect the invention provides a polymer composition comprising
　a) a low density polyethylene (LDPE); and
　b) a conjugated aromatic polymer.

In particular, the polymer composition of the invention comprises an LDPE and a polythiophene.

Viewed from another aspect, the invention provides a polymer composition comprising
　a) a low density polyethylene (LDPE); and
　b) a conjugated aromatic polymer;
wherein the polymer composition has lower DC conductivity when measured according to DC conductivity method as described under "Determination Methods" than an otherwise identical polymer composition not comprising the conjugated aromatic polymer.

Viewed from another aspect, the invention provides an insulation layer, e.g. of a cable, comprising a polymer composition as hereinbefore defined.

Viewed from another aspect, the invention provides a cable comprising one or more conductors surrounded by at least an insulation layer, wherein said insulation layer comprises a polymer composition as hereinbefore defined.

In particular the cable of the invention is a direct current (DC) power cable, preferably operating at or capable of operating at 320 kV or more, such as 650 kV or more.

Viewed from another aspect the invention provides a process for producing a cable comprising the steps of:
　applying on a conductor, preferably by (co)extrusion, at least an insulation layer wherein the insulation layer comprises a polymer composition as hereinbefore defined. In one embodiment the insulation layer may be crosslinked.

Viewed from another aspect the invention provides the use of a polymer composition as hereinbefore defined in the manufacture of an insulation layer in a cable.

DETAILED DESCRIPTION OF INVENTION

The present invention requires the combination of an LDPE polymer with a conjugated aromatic polymer in a polymer composition. The polymer composition unexpectedly has advantageous thermomechanical and electrical properties.

In particular, the polymer composition has improved thermomechanical resistance compared to LDPE alone or other blends of LDPE, such as LDPE containing low amounts of HDPE. Unexpectedly, the combination of a conjugated aromatic polymer with the LDPE has advantageous thermomechanical properties, e.g. in terms of reduced creep.

In particular, the polymer composition of the invention enables the formation of an insulation layer that has reduced creep. The higher thermomechanical performance of the invention may allow higher operating temperature of HVDC cables, which in principle can allow higher transmission capacity.

The polymer composition also has reduced, i.e. low, electrical conductivity. "Reduced" or "low" electrical conductivity as used herein interchangeably means that the value obtained from the DC conductivity measurement as defined below under "Determination methods" is low, i.e. reduced. The low electrical conductivity is beneficial for minimising undesired heat formation, e.g. in an insulation layer of a power cable.

Moreover and unexpectedly, the polymer composition has improved thermomechanical and electrical properties without the need for crosslinking. The non-crosslinked polymer composition still possesses the mechanical properties desired for an insulation layer of a power cable, such as a DC power cable. Non cross-linked polymer compositions or cable layers are regarded as thermoplastic.

Low Density Polyethylene (LDPE)

The low density polyethylene, LDPE, is a polyethylene produced in a high pressure process. Typically the polymerization of ethylene and optional further comonomer(s) in the high pressure process is carried out in the presence of an initiator(s). The meaning of LDPE polymer is well known and documented in the literature.

Although the term LDPE is an abbreviation for low density polyethylene, the term is understood not to limit the density range, but covers the LDPE-like HP polyethylenes with low, medium and higher densities. The term LDPE describes and distinguishes a high pressure polyethylene from polyethylenes produced in the presence of an olefin polymerisation catalyst. LDPEs have certain typical features, such as different branching architecture.

A "non-crosslinked" low density polyethylene (LDPE) means that the LDPE present in a layer of a final DC cable (in use) is not crosslinked and is thus thermoplastic.

The LDPE may be a low density homopolymer of ethylene (referred herein as LDPE homopolymer) or a low density copolymer of ethylene with one or more comonomer(s) (referred herein as LDPE copolymer). The one or more comonomers of the LDPE copolymer may be selected from the group consisting of polar comonomer(s), non-polar comonomer(s) or from a mixture of the polar comonomer(s) and non-polar comonomer(s). Moreover, said LDPE homopolymer or LDPE copolymer may optionally be unsaturated.

In embodiments wherein the LDPE is non-crosslinked, the LDPE may be an LDPE homopolymer. Alternatively, in embodiments wherein the LDPE is crosslinked, the LDPE may be an LDPE copolymer, in particular an LDPE copolymer of ethylene with one or more comonomers, such as octadiene.

In one embodiment, the LDPE is an LDPE homopolymer.

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. For example, comonomer(s) containing carboxyl and/or ester group(s) may are used as said polar comonomer. Further examples of the polar comonomer(s) of the LDPE copolymer include acrylate(s), methacrylate(s) or acetate(s), or any mixtures thereof.

If present in said LDPE copolymer, the polar comonomer(s) may be selected from the group of alkyl acrylates, alkyl methacrylates or vinyl acetate, or a mixture thereof. For example, said polar comonomers can be selected from $C_1$- to $C_6$-alkyl acrylates, $C_1$- to $C_6$-alkyl methacrylates or vinyl acetate. In one embodiment, said LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer, comonomer(s) other than the above defined polar comonomers can be used. For example, the non-polar comonomers are other than comonomer(s) containing hydroxyl group(s), alkoxy group(s), carbonyl group(s), carboxyl group(s), ether group(s) or ester group(s). One group of non-polar comonomer(s) includes those comprising (e.g. consisting of) mono-unsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it may comprise 0.001 to 35 wt.-%, such as less than 30 wt.-%, for example less than 25 wt.-%, of one or more comonomer(s) relative to the total weight of the copolymer as a whole. Example ranges include 0.5 to 10 wt %, such as 0.5 to 5 wt % comonomer.

The LDPE polymer, may optionally be unsaturated, i.e. may comprise carbon-carbon double bonds (—C═C—). Example "unsaturated" LDPEs contain carbon-carbon double bonds/1000 carbon atoms in a total amount of at least 0.4/1000 carbon atoms. If a non-crosslinked LDPE is used in the final cable, then the LDPE is typically not unsaturated as defined above. By not unsaturated is meant that the C═C content may be less than 0.2/1000 carbon atoms, such as 0.1/1000C atoms or less.

As well known, the unsaturation can be provided to the LDPE polymer by means of the comonomers, a low molecular weight (Mw) additive compound, such as a crosslinking booster, chain transfer agent (CTA) or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it may be for example an unsaturated LDPE copolymer of ethylene with at least one polyunsaturated comonomer, and optionally with other comonomer(s), such as polar comonomer(s), e.g. an acrylate or acetate comonomer(s). In one embodiment, an unsaturated LDPE copolymer is an unsaturated LDPE copolymer of ethylene with at least polyunsaturated comonomer(s).

The polyunsaturated comonomers may consist of a straight carbon chain with at least 8 carbon atoms and at least 4 carbons between the non-conjugated double bonds, of which at least one is terminal. For example, the polyunsaturated comonomer can be a diene, such as a diene which comprises at least eight carbon atoms, the first carbon-carbon double bond being terminal and the second carbon-carbon double bond being non-conjugated to the first one. Example dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. In some embodiments, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, e.g. to the total amount of the vinyl groups. Herein, when a compound which can also act as comonomer, such as propylene, is used as CTA for providing double bonds, then said copolymerisable comonomer is not calculated to the comonomer content.

If LDPE polymer is unsaturated, then it may have a total amount of carbon-carbon double bonds, which originate from vinyl groups, vinylidene groups and trans-vinylene groups, if present, of more than 0.4/1000 carbon atoms, such as of more than 0.5/1000 carbon atoms. The upper limit of the amount of carbon-carbon double bonds present in the polyolefin is not limited and may for example be less than 5.0/1000 carbon atoms, such as less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, may be higher than 0.40/1000 carbon atoms, such as higher than 0.50/1000 carbon atoms, for example higher than 0.60/1000 carbon atoms.

If the LDPE is unsaturated LDPE as defined above, it may contain at least vinyl groups and the total amount of vinyl groups can be higher than 0.05/1000 carbon atoms, such as higher than 0.08/1000 carbon atoms, for example higher than 0.11/1000 carbon atoms. In one embodiment, the total amount of vinyl groups is of lower than 4.0/1000 carbon atoms. The LDPE a) prior to crosslinking, may contain vinyl groups in total amount of more than 0.20/1000 carbon atoms, such as more than 0.30/1000 carbon atoms.

In an alternative embodiment the LDPE of the invention is not unsaturated and possesses less than 0.2 C=C/1000 C atoms.

The LDPE polymer of the invention typically has a high melting point, which may be of importance especially for a thermoplastic insulation material. Melting points of 112° C. or more are envisaged, such as 114° C. or more, especially 116° C. or more, such as 112 to 125° C.

Typically, in wire and cable (W&C) applications, the density of LDPE a) is higher than 860 kg/m$^3$. The density of the LDPE homopolymer or copolymer is usually not higher than 960 kg/m$^3$, and may be in the range from 900 to 945 kg/m$^3$.

The MFR$_2$ (2.16 kg, 190° C.) of the LDPE polymer, can be from 0.01 to 50 g/10 min, such as from 0.05 to 30.0 g/10 min, for example from 0.1 to 20 g/10 min, especially from 0.2 to 10 g/10 min.

The LDPE polymer is produced at high pressure by free radical initiated polymerisation (referred to as high pressure (HP) radical polymerization). The HP reactor can be e.g. a well-known tubular or autoclave reactor or a mixture thereof, especially a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., such as from 80 to 350° C. and pressure from 70 MPa, for example 100 to 400 MPa, especially from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, e.g. ethylene, and polyunsaturated comonomer and/or chain transfer agent, depending on the nature and amount of C=C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner.

The LDPE of the invention is not new. For example, Borealis grade LE6609-PH is suitable for use in the present invention.

Conjugated Aromatic Polymer

The conjugated aromatic polymer is a polymer which contains a sequence of alternating single and unsaturated (e.g. double or triple) carbon-carbon bonds. The polymer comprises at least one repeating aromatic moiety and at least some of the alternating single and unsaturated bonds are part of this aromatic structure. In one embodiment, all the unsaturated bonds are part of an aromatic system. In a further embodiment, the conjugated polymer may comprise a combination of unsaturated bonds which are part of an aliphatic system and unsaturated bonds which are part of an aromatic system.

In general, any suitable conjugated aromatic polymer known in the art may be used in the polymer compositions of the invention.

The conjugated aromatic polymer may be a homopolymer or a copolymer. Copolymers may be alternating copolymers of two or more different aromatic monomer moieties or a mixture or aromatic and aliphatic monomers. The conjugated aromatic polymer is usually a homopolymer.

Examples of suitable aromatic polymers include polyfluorenes, polyphenylenes, poly(phenylene vinylene), polypyrenes, polyazulenes, polynaphthalenes, polypyrroles, polycarbazoles, polyindoles, polyazepines, polyanilines, polythiophenes, polypyrroles, polyfuranes, polyselenophenes, polythienothiophenes, polybenzodithiophenes, polycarbazoles, polydithieno-siloles, polybenzothiazoles, polytriarylamines, polyquinoxalines, polyisoindigos, poly(perylene diimides), poly(naphthalene diimides), polycyclopentadithiophenes, polydithieno-pyrroles, polyquinoxalines, polythienopyrazines, polynaphthothiadiazoles, polybenzothiadiazoles, polythienopyrroledions, polydiketopyrolopyrroles, polybenzooxadiazoles, polyfullerenes and polyisothianaphthalenes, or copolymers thereof.

In one embodiment, the conjugated polymer is a polythiophene. The polythiophene is a polymer containing at least two thiophene repeating units. Polythiophenes are conjugated systems which are typically semiconductors in their pristine, undoped state. The materials become conducting when electrons are added or removed via doping with e.g. oxygen or other oxidising agents.

Any suitable polythiophene known in the art may be used in the polymer compositions of the invention. The thiophene repeating unit may comprise a single thiophene ring, or more than one thiophene ring with differing substituents. Moreover, it is possible for the thiophene ring to be fused to a second ring system which may be aromatic or aliphatic.

Typically, the thiophene is a homopolymer with the general formula (I):

wherein $R_1$ and $R_2$ are each independently selected from the group consisting of hydrogen, halo (e.g. fluoro), alkoxy, linear or branched $C_{1-20}$ alkyl group or a $C_{3-12}$ cycloalkyl group and optionally substituted $C_{6-20}$ aryl groups; and wherein n is an integer in the range 2 to 1000.

The term "alkyl" is intended to cover linear or branched alkyl groups such as all isomers of propyl, butyl, pentyl and hexyl. In all embodiments, the alkyl group is usually linear. Example cycloalkyl groups include cyclopentyl and cyclohexyl.

Examples of the substituted aryl groups include aryl groups substituted with at least one substituent selected from halogens, alkyl groups having 1 to 8 carbon atoms, acyl groups, or a nitro group. Typical aryl groups include substituted and unsubstituted phenyl, benzyl, phenylalkyl or naphthyl.

In some embodiments n may be an integer in the range 2 to 500, such as 2 to 250.

In one embodiment, $R_1$ is hydrogen.

In another embodiment, $R_1$ is hydrogen and $R_2$ is hydrogen or hexyl, such as hexyl (i.e. the polythiophene is poly-3-hexylthiophene (P3HT)).

The polythiophene may be regio-regular. By regio-regular we mean that the monomers of the polythiophene are coupled together in a regular fashion throughout the polymer. Thiophene monomers can link at either the 2-position or 5-position of the ring, giving four possible regio-regular coupling patterns;

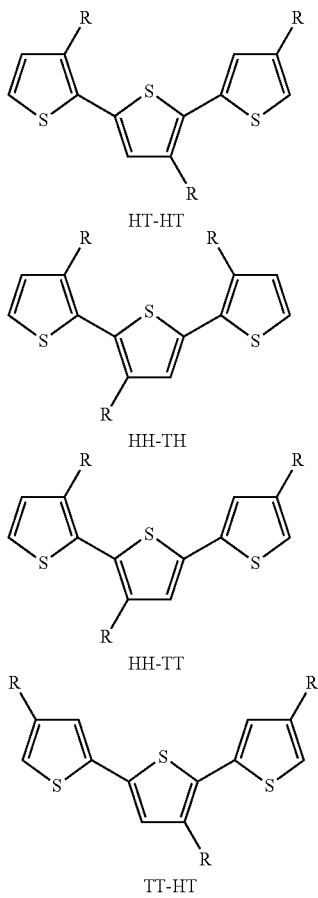

wherein HH means head-head coupling, HT means head-tail coupling, TT means tail-tail coupling and TH means tail-head coupling.

The polythiophene used in the polymer compositions of the invention usually exhibits head-tail coupling. Typically, the polythiophene has a head-tail regioregularity of greater than 95%, even more preferably greater than 98%, when measured by $^1$H NMR.

The number average molecular weight (Mn) of the polythiophene is typically in the range 5000 to 150000, such as 10000 to 100000, especially 30000 to 75000.

The molecular weight distribution (Mw/Mn) of the polythiophene may be in the range 1 to 10, such as 2 to 5.

Polymer Composition

The polymer composition of the invention comprises
a) a low density polyethylene (LDPE); and
b) a conjugated aromatic polymer.

Whilst it is within the ambit of the invention for the polymer composition to contain further polymer components in addition to LDPE a) and conjugated aromatic polymer b), in one embodiment the polymer composition of the invention can consist of LDPE a) and conjugated aromatic polymer b) as the sole polymer components. It will be appreciated that a polymer composition consisting of components a) and b) as the sole polymer components does not exclude the possibility for the composition to further comprise standard polymer additives such as scorch retarders, water tree retarders, antioxidants and so on.

The LDPE a) may be present in an amount of 90 to 99.99 wt %, such as 95 to 99.98 wt %, for example 97.5 to 99.95 wt %, especially 98.5 to 99.90 wt %, relative to the total weight of the polymer composition as a whole.

The conjugated aromatic polymer b) may be present in an amount of 0.01 to 10 wt %, such as 0.02 to 5 wt %, for example 0.05 to 3.5 wt %, especially 0.1 to 2.0 wt %, relative to the total weight of the polymer composition as a whole.

The polymer composition of the invention preferably has an electrical conductivity of 1.0E-12 S/cm or less, more preferably of 0.5E-12 S/m or less, more preferably of 1.0E-13 S/m or less, such as 0.01E-14 to 10.0E-14 S/m, more preferably of 0.5E-14 to 8.0E-14 S/m, more preferably of 1.0E-14 to 5.0E-14 S/m, when measured according to DC conductivity method as described under "Determination Methods".

Where the polymer composition has lower DC conductivity when measured according to DC conductivity method as described under "Determination Methods" than an otherwise identical polymer composition not comprising the conjugated aromatic polymer, the difference in conductivity is ideally at least 10% lower, such as 50% lower. In a most preferred embodiment, the DC conductivity is at least 10× lower than an otherwise identical polymer composition not comprising the conjugated aromatic polymer.

The polymer composition of the invention is typically prepared by mixing components a) and b). Mixing may take place by any known method in the art, such as melt-mixing.

The invention enables the formation of cables with very low creep. We can measure creep using Dynamic Mechanical Analysis (DMA). The polymer composition of the invention (and hence the insulation layer) may have a strain (DMA method A) of below 30% after 20 min, such as a strain below 40% after 25 min, for example below 45% after 30 min, especially below 50% after 35 min. In some embodiments, strain can be below 20% after 20 mins, especially below 20% after 40 mins (method A). It is possible for a polymer composition of the invention to meet one of these requirements, more than one or all of these requirements.

It is also possible for the polymer composition (and hence the insulation layer) to have a strain (DMA method B) below 30% after 20 min, such as below 40% after 25 min, for example below 45% after 30 min, especially below 50% after 35 min. In some embodiments, strain can be below 20% after 20 mins, especially below 20% after 40 mins (method B). It is possible for a polymer composition of the invention to meet one of these requirements, more than one or all of these requirements.

The polymer composition is ideally heat treated once prepared. This may allow for the creep properties to be optimised. The term "heat treated" in the context of the invention means that the polymer composition has been heated to a temperature above the melting temperature of the conjugated aromatic polymer and then allowed to cool back to room temperature. Temperatures considered sufficient to melt the conjugated aromatic polymer may typically be in the range of at least 150° C., such as at least 200° C., e.g. at least 250° C. The temperature for the heat treatment may be no more than 350° C., such as no more than 300° C. Cooling may take place at a cooling rate of between 1° C./min and 25° C./min, for example less than 5° C. per min. By "room temperature" we usually mean a temperature in the range in the range 12 to 35° C.

Without wishing to be bound by theory it is considered that heating the polymer composition to a temperature above the melting temperature of the conjugated aromatic polymer, followed by subsequent cooling, may lead to an improved distribution of this component within the composition, possibly via the formation of a network of crystals. This network could act as a frame helping the material to keep its dimensional stability and leading to improved thermomechanical properties.

End Uses and End Applications of the Polymer Composition of Invention

The polymer composition of the invention can be used for producing an insulation layer of a cable, such as a direct current (DC) power cable, as defined above, below or in the claims.

The invention thus further provides a cable comprising one or more conductors surrounded by at least an insulation layer, wherein said insulation layer comprises a polymer composition as hereinbefore defined. For example, the cable typically comprises at least an inner semiconductive later, an insulation layer and an outer semiconductive layer, in that order, wherein said insulation layer comprises a polymer composition as hereinbefore defined The cable of the invention is preferably a DC power cable. A DC power cable is defined to be a DC cable transferring energy operating at any voltage level, typically operating at voltages higher than 1 kV. The DC power cable can be a low voltage (LV), a medium voltage (MV), a high voltage (HV) or an extra high voltage (EHV) DC cable, which terms, as well known, indicate the level of operating voltage. The polymer may, for example, be used in the insulation layer for a DC power cable operating at voltages higher than 36 kV, such as a HV DC cable. For HV DC cables the operating voltage is defined herein as the electric voltage between ground and the conductor of the high voltage cable.

In one embodiment, the HV DC power cable of the invention is one operating at voltages of 40 kV or higher, even at voltages of 50 kV or higher. For example, the HV DC power cable operates at voltages of 60 kV or higher. The invention is also highly feasible in very demanding cable applications and further cables of the invention are HV DC power cable operating at voltages higher than 70 kV. Voltages of 100 kV or more are targeted, such as 200 kV or more, such as 300 KV or more, especially 400 kV or more, more especially 500 kV or more. Voltages of 640 KV or more, such as 700 kV are also envisaged. The upper limit is not limited. The practical upper limit can be up to 1500 kV, such as 1100 kV. The cables of the invention operate well therefore in demanding extra HV DC power cable applications operating 400 to 850 kV, such as 650 to 850 kV. The cable of the invention, such as a DC cable, typically comprises an inner semiconductive layer comprising a first semiconductive composition, an insulation layer comprising the polymer composition of the invention and an outer semiconductive layer comprising a second semiconductive composition, in that order.

The polymer composition of the invention is used in the insulation layer of the cable. Ideally, the insulation layer comprises 95 wt % of the polymer composition of the invention or more such as 98 wt % of the polymer composition or more, e.g. 99 wt % of the polymer composition or more. In one embodiment the polymer composition of the invention is the only polymer component used in the insulation layer of the cables of the invention, e.g. the insulation layer consists essentially of the polymer composition of the invention. The term consists essentially of is used herein to mean that the only polymer component present in the insulation layer is the polymer composition. It will be appreciated that the insulation layer may contain standard polymer additives such as scorch retarders, water tree retarders, antioxidants and so on. These are not excluded by the term consists essentially of. Note also that these additives may be added as part of a masterbatch and hence carried on a polymer carrier. The use of masterbatch additives is not excluded by the teen consists essentially of.

The insulation layer can have a beneficial low electrical conductivity when it is crosslinked with a crosslinking agent. The insulation layer of the cables of the invention can thus optionally be crosslinkable. In one embodiment the insulation layer is not crosslinked.

The term crosslinkable means that the insulation layer can be crosslinked using a crosslinking agent before use. The insulation layer will need to comprise a crosslinking agent in order to be crosslinkable, typically a free radical generating agent. The crosslinked polymer composition has a typical network, i.a. interpolymer crosslinks (bridges), as well known in the field.

If the insulation layer is crosslinked, any parameter of the insulation layer is ideally measured on the crosslinked cable unless otherwise indicated. Crosslinking may contribute to the mechanical properties and the heat and deformation resistance of the polymer composition.

In embodiments, wherein the insulation layer comprises no crosslinking agent, the electrical conductivity as described under the "Determination method" is measured from a sample of polymer composition forming the insulation layer which is non-crosslinked (i.e. does not contain a crosslinking agent and has not been crosslinked with a crosslinking agent). In embodiments wherein the insulation layer is crosslinked with a crosslinking agent, then the electrical conductivity is measured from a sample of the crosslinked polymer composition (i.e. a sample of the polymer composition is first crosslinked with the crosslinking agent initially present and then the electrical conductivity is measured from the obtained crosslinked sample).

The amount of the crosslinking agent used, if present, can vary within the ranges given below. For example a peroxide may be used in an amount of 0 to 110 mmol —O—O—/kg polymer composition of the insulation layer, such as 0 to 90 mmol —O—O—/kg polymer composition (corresponds 0 to 2.4 wt % of dicumyl peroxide based on the polymer composition), for example of 0 to 37 mmol —O—O—/kg polymer composition, especially of 0 to 35 mmol —O—O—/kg polymer composition, such as of 0 to 34 mmol —O—O—/kg polymer composition, for example of 0 to 33 mmol —O—O—/kg polymer composition, especially from 0 to 30 mmol —O—O—/kg polymer composition, such as from 0 to 20 mmol —O—O—/kg polymer composition, for example from 0 to 10.0 mmol —O—O—/kg polymer composition, especially from 0 to 7.0 mmol —O—O—/kg polymer composition, such as less than 5.0 mmol —O—O—/kg polymer composition, for example the polymer composition comprises no crosslinking agent (=0 wt % of added crosslinking agent). The insulation layer is thus ideally free of byproducts of the decomposition of the peroxide.

The lower limit of the crosslinking agent, if present, is not limited and can be at least 0.1 mmol —O—O—/kg polymer composition in the insulation layer, such as at least 0.5 mmol —O—O—/kg polymer composition, for example at least 5.0 mmol —O—O—/kg polymer composition. The lower peroxide content can shorten the required degassing step of the produced and crosslinked cable, if desired.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well-known dicumyl peroxide based on the total amount (100 wt %) of the polymer composition.

The polymer composition may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. For example, the peroxide may be selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. In one embodiment, the peroxide is dicumylperoxide.

In an alternative embodiment the insulation layer is not crosslinked. In such cases, the insulation layer will generally comprise no crosslinking agent. The prior art drawbacks relating to the use of a crosslinking agent in a cable layer can therefore be avoided. Naturally, the non crosslinked embodiment also simplifies the cable production process. As no crosslinking agent is required, the raw material costs are lower. Also, it is generally required to degas a cross-linked cable layer to remove the by-products of the peroxide after crosslinking. Where the material is not crosslinked, no such degassing step is required.

The insulation layer may contain, in addition to the polymer composition and the optional peroxide, further component(s) such as additives (such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s), dielectric liquids and voltage stabilizer(s), as known in the polymer field.

The insulation layer may therefore comprise conventionally used additive(s) for W&C applications, such as one or more antioxidant(s) and optionally one or more scorch retarder(s), for example at least one or more antioxidant(s). The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

In one embodiment, the insulation layer does not comprise a carbon black. The insulation layer generally does not comprise flame retarding additive(s), e.g. a metal hydroxide containing additives in flame retarding amounts.

The insulation layer of the cable of the invention preferably has an electrical conductivity of 1.0E-12 S/cm or less, more preferably of 0.5E-12 S/m or less, more preferably of 1.0E-13 S/m or less, such as 0.01E-14 to 10.0E-14 S/m, more preferably of 0.5E-14 to 8.0E-14 S/m, more preferably of 1.0E-14 to 5.0E-14 S/m, when measured according to DC conductivity method as described under "Determination Methods".

The cable of the invention may also contain inner and outer semiconductive layers. These can be made of any conventional material suitable for use in these layers. The inner and the outer semiconductive compositions can be different or identical and may comprise a polymer(s) which is, for example, a polyolefin or a mixture of polyolefins and a conductive filler, such as carbon black. Suitable polyolefin(s) are e.g. polyethylene produced in a low pressure process or a polyethylene produced in a HP process (LDPE). The general polymer description as given above in relation to the LDPE a) applies also for the suitable polymers for semiconductive layers. The carbon black can be any conventional carbon black used in the semiconductive layers of a DC power cable, such as in the semiconductive layer of a DC power cable. The carbon black may have one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, such as furnace carbon black and acetylene carbon black. The polymer composition can comprise 10 to 50 wt % carbon black, based on the weight of the Semiconductive composition.

In one embodiment, the outer semiconductive layer is cross-linked. In another embodiment, the inner semiconductive layer is non-crosslinked. For example, the inner semiconductive layer and the insulation layer may remain non crosslinked where the outer semiconductive layer is cross-linked. A peroxide crosslinking agent can therefore be provided in the outer semiconductive layer only.

The cable comprises one or more conductors. Each conductor may comprise one or more conductors, e.g. wires. For example, each conductor is an electrical conductor and comprises one or more metal wires. Cu wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of applying on a conductor, such as by (co)extrusion, at least an insulation layer, wherein the insulation layer comprises a polymer composition comprising an LDPE and a conjugated aromatic polymer. In one embodiment the process comprises the steps of applying on a conductor, such as by (co)extrusion, an inner semiconductive layer, an insulation layer and an outer semiconductive layer, in that order, wherein the insulation layer comprises a polymer composition comprising an LDPE and a conjugated aromatic polymer. The insulation layer may be not crosslinked.

The process may optionally comprise the steps of crosslinking one or both of the inner semiconductive layer or outer semiconductive layer, without crosslinking the insulation layer. In one embodiment, the outer semiconductive layer is crosslinked, without crosslinking the insulation layer. Furthermore, the inner semiconductive layer may be not crosslinked. Thus, the semi-conductive layer may comprise a peroxide which enables the crosslinking of the semi-conductive composition.

In one embodiment, a cable is produced, wherein the process comprises the steps of (a)—providing and mixing, such as melt mixing in an extruder, an optionally crosslinkable first semiconductive composition comprising a polymer, a carbon black and optionally further component(s) for the inner semiconductive layer, providing and mixing, such as melt mixing in an extruder, the optionally crosslinkable polymer composition of the invention; and providing and mixing, such as melt mixing in an extruder, a second semiconductive composition which is optionally crosslinkable and comprises a polymer, a carbon black and optionally further component(s) for the outer semiconductive layer, (b) applying on a conductor, preferably by coextrusion, a melt mix of the first semiconductive composition obtained from step (a) to form the inner semiconductive layer, a meltmix of polymer composition of the invention obtained from step (a) to form the insulation layer, and a meltmix of the second semiconductive composition obtained from step (a) to form the outer semiconductive layer, and (c) optionally crosslinking at crosslinking conditions one or both of the first semiconductive composition of the inner semiconductive layer and the second semiconductive composition of the outer semiconductive layer, of the obtained cable, and optionally crosslinking the insulation layer, for example without crosslinking the insulation layer.

In step (c) the second semiconductive polymer composition of the outer semiconductive layer may be crosslinked, for example crosslinked without crosslinking the insulation layer. Furthermore, the second semiconductive polymer composition of the outer semiconductive layer can be crosslinked, without crosslinking the insulation layer or the first semiconductive composition of the inner semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer of the invention and the optional and preferred first and second semiconductive compositions can be produced before or during the cable production process.

In a further embodiment, the invention relates to a process for producing a cable comprising:

heating a polymer composition comprising a low density polyethylene (LDPE) and a conjugated aromatic polymer to a temperature above the melting temperature of the conjugated aromatic polymer;

applying on a conductor, preferably by (co)extrusion, at least an insulation layer, wherein the insulation layer comprises a heat treated polymer composition as herein before defined;

cooling the insulation layer, such as at a cooling rate between 1° C./min and 25° C./min, for example less than 5° C. per min The polymers required to manufacture the cable of the invention may be provided to the cable production process in form of powder, grain or pellets. Pellets mean herein generally any polymer product which is formed from reactor-made polymer (obtained directly from the reactor) by post-reactor modification to a solid polymer particles.

The (melt) mixing step (a) of the provided polymer composition of the invention and of the preferable first and second semiconductive compositions may be carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any crosslinking agent can be added before the cable production process or during the (melt) mixing step (a). For instance, the crosslinking agent and also the optional further component(s), such as additive(s), can already be present in the polymers used. The crosslinking agent is added, such as impregnated, onto the solid polymer particles, e.g. pellets.

The melt mix of the polymer composition obtained from (melt)mixing step (a) may consist of the polymer composition of the invention as the sole polymer component(s). The optional and preferable additive(s) can be added to polymer composition as such or as a mixture with a carrier polymer, i.e. in a form of so-called master batch.

The optional crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The advantages of the most preferred embodiment of having the inner semiconductive layer and the insulation layer non-crosslinked in combination with an outer semiconductive layer which is crosslinked include:

Optimal electrical performance of the insulation system of the HV DC cable,

The connection of cables is very feasible due to non-crosslinked thermoplastic insulation composition, No need to wait and allow the heat to transfer through the insulation and inner semiconductive layers, since not crosslinked. The overall production efficiency is improved, especially in HV applications with thick insulation layer, since the inner semiconductive layer and the insulation layer need not to be crosslinked. Crosslinking of inner and outer semiconductive and insulation layers require typically at least 1 hour, while crosslinking of only the outer semiconductive layer takes less than 8 minutes, Robust high speed extrusion possible leading to longer stable production periods at higher extrusion speed and quality due to no risk to scorching (undesired premature crosslinking) in the inner semiconductive and insulation layers, Degassing step can be reduced, and thus accelerate the overall cable production process, since any undesired by-products, i.e. decomposition products, formed from the crosslinking agent, are easier to remove, i.e. degas, only from the outer layer, The crosslinked outer semiconductive layer is mechanically unexpectedly sufficient to protect the insulation layer from mechanical and thermal crack initiation, expressed as TSCR (Thermal stress cracking).

The thickness of the insulation layer of the cable, e.g. the DC power cable such as HV DC power cable, is typically 2 mm or more, such as at least 3 mm, for example of at least 5 to 100 mm, especially from 5 to 50 mm, for instance 5 to 40 mm, e.g. 5 to 35 mm, when measured from a cross section of the insulation layer of the cable.

The thickness of the inner and outer semiconductive layers is typically less than that of the insulation layer, and in HV DC power cables can be e.g. more than 0.1 mm, such as from 0.3 up to 20 mm, 0.3 to 10 of inner semiconductive and outer semiconductive layer. The thickness of the inner semiconductive layer can be 0.3-5.0 mm, such as 0.5-3.0 mm, for example 0.8-2.0 mm. The thickness of the outer semiconductive layer can be from 0.3 to 10 mm, such as 0.3 to 5 mm, for example 0.5 to 3.0 mm, especially 0.8-3.0 mm. It is evident for and within the skills of a skilled person that the thickness of the layers of the DC cable depends on the intended voltage level of the end application cable and can be chosen accordingly.

The preferable embodiments of the invention can be combined with each other in any way to further define the invention.

The invention will now be described with reference to the following non limiting examples and figures.

DETERMINATION METHODS

Figure 1:
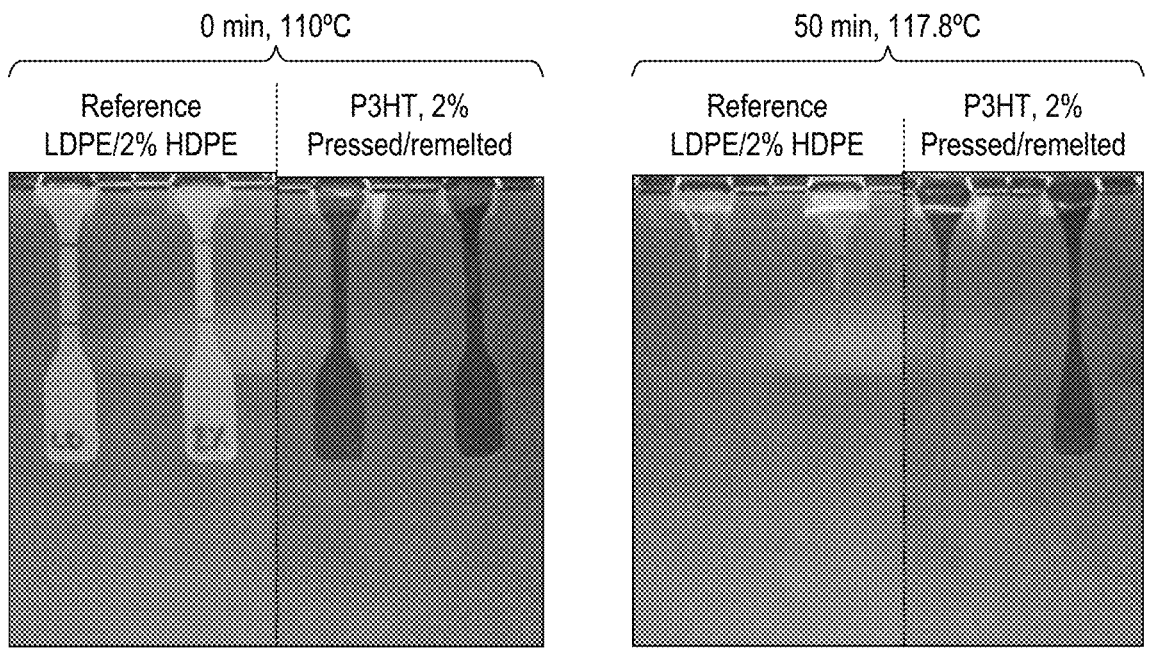
FIG. 1 shows creep elongation of neat LDPE, a blend of LDPE with 2 wt % HDPE and pressed and remelted blends of LDPE with 2 wt % P3HT under their own weight, solidified by rapid quenching. Note that samples are false-colored to increase contrast.

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Quantification of Alpha-Olefin Content in Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains $0.20/M_{butylacrylate}$ (128 g/mol)=$1.56 \times 10^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Xylene Solubles (XS)

Xylene solubles were determined at 23° C. according ISO 6427.

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A \times 14)/(E \times L \times D)$$

were A is the maximum absorbance defined as peak height, E the molar extinction coefficient of the group in question (l·mol$^{-1}$·mm$^{-1}$), L the film thickness (mm) and D the density of the material (g·cm$^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene [2-methyhept-1-ene] giving E=18.24 l·mol$^{-1}$·mm$^{-1}$ trans-vinylene (R—CH=CH—R') via 965 cm$^{-1}$ based on trans-4-decene [(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene [2-methyl-hept-1-ene] giving E=18.24 l·mol$^{-1}$·mm$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm$^{-1}$ via:

$$E=A/(C \times L)$$

where A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

DMA Creep Test—Methods A and B

Melt pressed films with a thickness of 1 mm, width of 4 mm and length of around 10 mm where placed in a TA DMA Q800 using a film tension setup. A stress corresponding to 1 kPa (method A) or 2 kPa (method B) was applied to the films while temperature was increased from 50° C. to 115° C. (method A) or from 50° C. to 125° C. (method B) using a heating rate of 10° C./min. Temperature was held at 115° C. or 125° C. respectively for at least 40 min while still applying a stress of 1 kPa or 2 kPa respectively. Strain was recorded during the experiment and a final strain was noted after 40 min. Heat treated films were heated to 250° C. and then subsequently allowed to cool back to room temperature, prior to carrying out the above method.

Creep Measurements 1 mm thick dog-bone-shaped pieces, approximately 60 mm in length, 15 mm in width at the wide point and 6 mm at the narrow point, were cut from melt-pressed films described above in connection with the DMA test. The melt pressed film had been cooled at three different rates, i.e. (1) quenched in liquid nitrogen, (2) cooled at ΔT/Δt~−25° C. min-1 and (3) slowly cooled at ΔT/Δt~−1° C. min-1. The pieces of melt-pressed film were suspended in an oven preheated to 116° C., i.e. to a temperature above Tm LDPE but below the co-crystal melting peak.

In FIG. 1, the temperature of the dog bone shaped pieces of melt-pressed film is measured at the times indicated using a thermocouple. At 0 minutes therefore, the pieces of melt-pressed film have been heated to around 110° C. After fifty minutes, the pieces of melt-pressed film are essentially at the same temperature as the oven and remain at that temperature.

DC Conductivity Method

Conductivity measurements were obtained by the use of dielectric spectroscopy. All measurements were performed on disk-shaped samples with 40 mm diameter and ~0.1 mm thickness.

Broadband Dielectric Spectroscopy (BDS) was performed using a Novocontrol alpha spectrometer in a frequency range of 10$^{-2}$ to 10$^7$ Hz, at different temperatures in the range 253-383K with an error of ±0.1K, at atmospheric pressure and under nitrogen atmosphere.

For selected temperatures frequency scans were also performed to investigate the local and ion dynamics. The sample cell consisted of two silver-coated electrodes 40 mm in diameter and the sample with a thickness of about 0.1 mm. The complex dielectric permittivity $\varepsilon^*=\varepsilon'-i\varepsilon''$, where $\varepsilon'$ is the real and $\varepsilon''$ is the imaginary part, is generally a function of frequency, $\omega$, temperature T, and pressure P, although here only the frequency and temperature dependencies have been investigated. The complex dielectric conductivity $\sigma^*$ can be also calculated from the complex dielectric function $\varepsilon^*$ as $\sigma^*=i\omega\varepsilon_1\varepsilon^*$, ($\varepsilon_f$ is the permittivity of free space, 8.854 pF/m) where conductivity can also be analysed in a real and an imaginary part: $\sigma^*=\sigma'+i\sigma''$. This means the conductivity data are effectively an alternative representation of the permittivity, nevertheless focusing on different features of the dielectric behaviour.

Experimental Part

The following materials were used:

Polythiophene: Poly(3-hexylthiophene-2,5-diyl(P3HT), a commercially available regio-regular polythiophene (supplier Solaris Chem Inc)

HDPE: A conventional unimodal high density polyethylene (0.8 mol % 1-butene content, as the comonomer) which is produced in a gas phase reactor. The HDPE has an MFR$_2$ of 12g/10 min (190° C./2.16 kg) and a density of 962 kg/m$^3$.

LDPE: LDPE homopolymer having the properties of Table 1:

TABLE 1

Polymer properties of LDPE

| Base Resin Properties | LDPE |
|---|---|
| MFR$_2$, 190° C. [g/10 min] | 0.3 |
| Density [kg/m$^3$] | 930 |
| Tensile modulus | 350 MPa |
| Flex Modulus | 330 MPa |

Example 1

Several mixtures were prepared by melt mixing at 210° C. for 10 minutes in a Haake mini twin screw extruder followed by hot pressing samples of an area 40 mm×100 mm at 220° C. and 100 kN press force. Spacers with a thickness of 1 mm were used to control thickness. An extra heat treatment was applied on one sample by remelting the pressed sample on a hot plate pre-heated to 250° C. for 3 minutes followed by slow cooling by turning of the hot plate. Sample was removed when temperature reached 200° C. and then finally cooled at room temperature. The compositions studies are shown in Table 2.

TABLE 2

Polymer compositions of the invention and reference compositions:

| Components | Inv. comp 1 | Comparative comp. 1 | Comparative comp. 2 |
|---|---|---|---|
| LDPE, wt % | 98 | 100 | 98 |
| P3HT, wt % | 2 | — | — |
| HDPE, wt % | — | — | 2 |

Creep Measurements

In FIG. 1 a visual representation of the creep measurement results for the compositions of Table 2 can be seen. From these results we can see that the inclusion of P3HT in the LDPE matrix offers significant improvement of the thermomechanical behaviour.

After an initial lag time of about 15 min pure LDPE samples (comparative comp. 1) started to elongate under their own weight and eventually reached the bottom of the oven (See FIG. 1). For comparative comp. 2 with HDPE=2 wt % the sample largely kept its shape even after an extended period of time, indicating excellent form stability at 115° C. Moreover, we observed a minor impact of the cooling rate, which correlates with the degree of co-crystallization on the creep resistance. Rapid quenching maximizes the formation of co-crystals, whereas slow cooling increasingly favours segregation of LDPE and HDPE and thus the formation of pure crystalline domains. For comparative comp. 2 quenching resulted in low creep with a rate of ~0.2% min$^{-1}$, whereas for slower cooling no creep was observed. In the case of P3HT the shape and size of the sample remain almost intact.

For the inventive P3HT based system (inventive example 1) the melting step at 250° C. is advantageous for improving the thermomechanical behaviour. At the compounding temperature of 210° C., P3HT is semi-crystalline (melting temperature typically between 220 to 250° C.), which prevents good homogeneisation during the performed extrusions step. P3HT melts during the hot-pressing step at 220° C. and, due to partial miscibility in polyethylene, diffuses into LDPE, forming a more homogeneous blend. Upon cooling a fine distribution of semi-crystalline P3HT is obtained. The purple colour of the samples indicates that P3HT is semi-crystalline. Pressed sample at 220° C. displays only small improvements in thermomechanical properties at 116° C., however the remelted sample has greater thermomechanical properties at temperatures of nearly 118° C. with almost no elongation at all. When remelting the blend and cooling it slowly P3HT has the possibility to form a network of crystals percolating the material, the network of high melting P3HT crystals can then act as frame that helps the material keeps it dimensional stability. For the sample that was not heat treated the crystalline domains of P3HT were probably not mixed or distributed to the same extent causing inferior thermomechanical properties.

DMA Results

Figure 2:
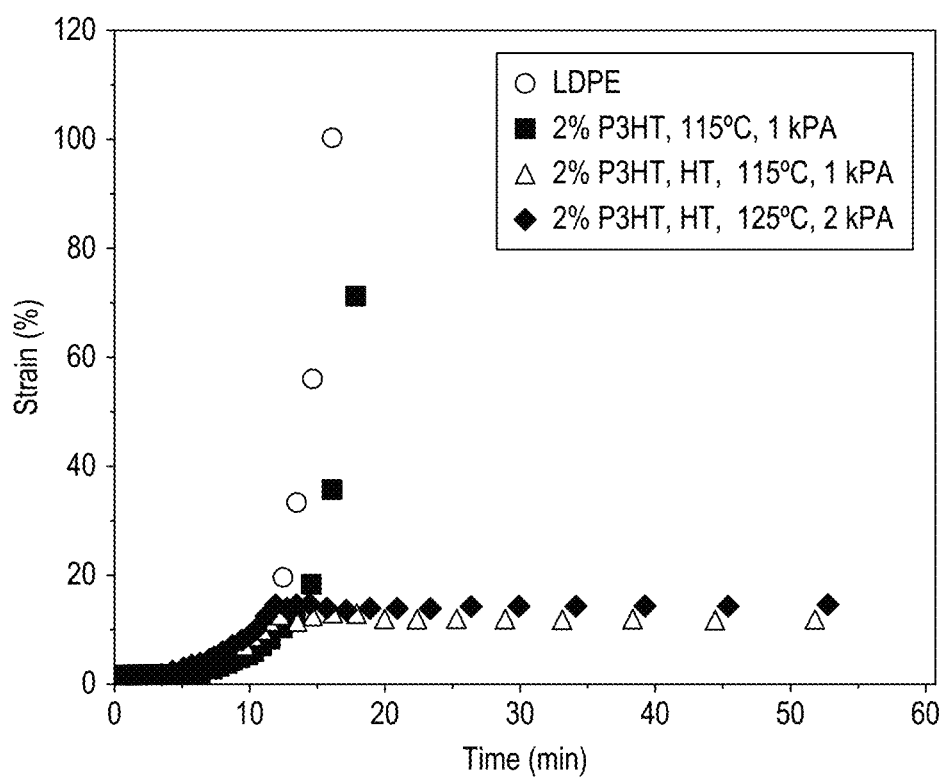
FIG. 2 shows the DMA results for neat LDPE and a blend of LDPE with 2 wt % P3HT (comparative example 1 and Inventive example 1) with and without heat treatment. The neat LDPE and non heat treated blend are measured using method A. The heat treated samples are measured using both methods A and B.
Figure 3:
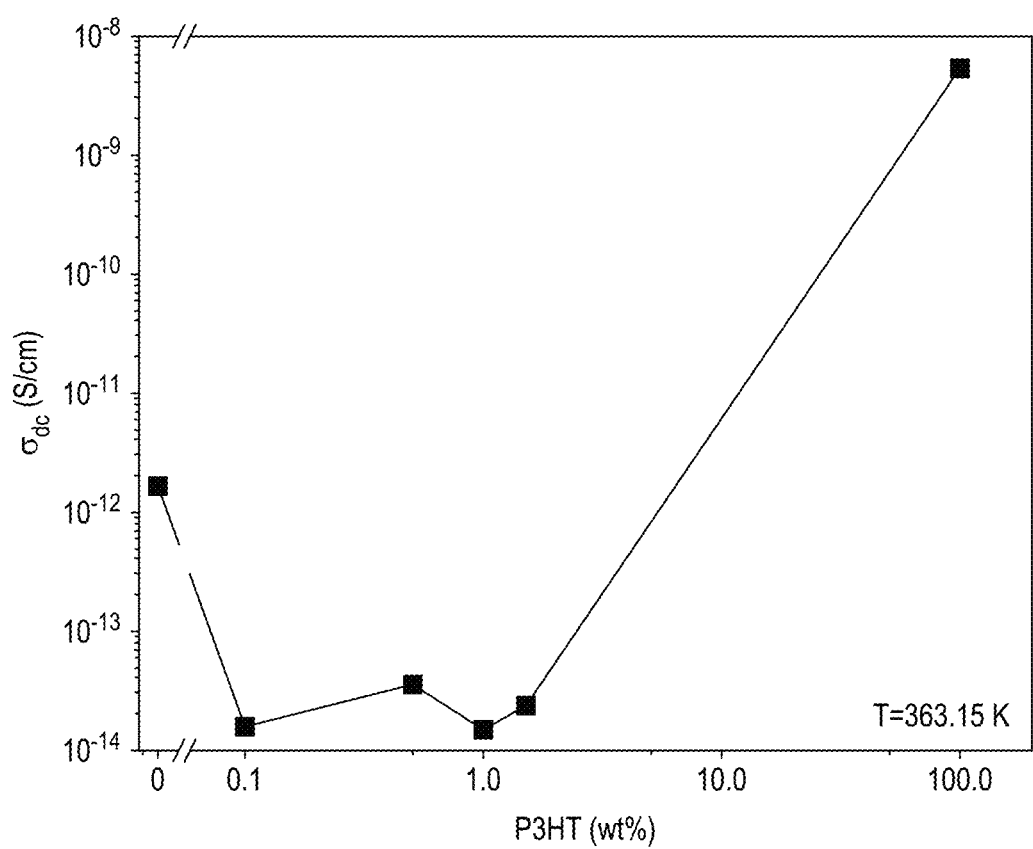
FIG. 3 shows the conductivity results for Inventive compositions 2 to 5 and Comparative compositions 3 and 4.

FIG. 2 shows the DMA results for neat LDPE and a blend of LDPE with 2 wt % P3HT (comparative example 1 and Inventive example 1) with and without heat treatment. The neat LDPE and non heat treated blend are measured using method A. The heat treated samples are measured using both methods A and B. In particular, the heat treated samples show excellent results with a strain below 20% for at least up to 50 minutes.

Example 2

Several mixtures were prepared by melt mixing the components at 160° C. for 10 minutes in a Haake mini twin screw extruder followed by hot pressing samples of an area of 40 mm×100 mm at 250° C. and 100 kN press force. Spacers with a thickness of 0.1 mm were used to control thickness. The conductivity results are shown in Table 2 and FIG. 1.

TABLE 3

Polymer compositions of the invention and reference compositions and the electrical conductivity results:

| Components | Inv. Comp 2 | Inv. Comp 3 | Inv Comp 4 | Inv Comp 5 | Ref comp 3 | Ref comp 4 |
|---|---|---|---|---|---|---|
| LDPE, wt %* | 99.9 | 99.5 | 99 | 98.5 | 100 | |
| P3HT, wt %* | 0.1 | 0.5 | 1 | 1.5 | | 100 |
| DC conductivity S/cm | 1.65E−14 | 3.72E−14 | 1.52E−14 | 2.48E−14 | 1.64E−12 | 4.98E−09 |

As can be seen from Table 3, polymer compositions of inventive examples 2-5 show excellent low DC conductivity. Furthermore, the DC conductivity drops by around 2 orders of magnitude when the pure LDPE is enhanced with the P3HT. The polymer compositions of the invention are particularly useful in DC power cables, preferably in HV DC power cables.

The invention claimed is:

1. An insulation layer comprising a polymer composition, the polymer composition comprising a blend of:
   a) a low density polyethylene (LDPE); and
   b) a conjugated aromatic polymer;
   wherein the LDPE is present in an amount of 90 to 99.99 wt % relative to the total weight of the polymer composition as a whole;
   wherein the conjugated aromatic polymer b) is present in an amount of from 0.01 to 10 wt %, relative to the total weight of the polymer composition as a whole;
   wherein the insulation layer does not comprise a carbon black,
   wherein the polymer composition is prepared by melt-mixing above the melting point of at least the LPDE and the melt-mixed polymer composition is heat treated by remelting at a temperature above the melting temperature of the conjugated aromatic polymer of from 220° C. to 350° C.,
   wherein the conductivity of the polymer composition is 1.0 E-12 S/cm or less when measured according to DC conductivity method as described under "Determination Methods",
   wherein DC conductivity when measured according to DC conductivity method as described under "Determination Methods" of the polymer composition is at least 10% lower than an otherwise identical polymer composition not comprising the conjugated aromatic polymer, and
   wherein the conjugated aromatic polymer is a polythiophene having the general formula (I):

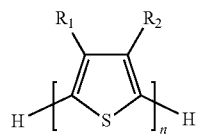

(I)

wherein $R_1$ is hydrogen and $R_2$ is hexyl; and
   wherein n is an integer in the range 2 to 1000.

2. The insulation layer of claim 1, wherein the conjugated aromatic polymer b) is present in an amount of 0.02 to 5 wt %, relative to the total weight of the polymer composition as a whole.

3. The insulation layer of claim 1, wherein the LDPE is selected from a LDPE homopolymer and a LDPE copolymer of ethylene with one or more comonomer(s), wherein the LDPE homopolymer and LDPE copolymer of ethylene with one or more comonomer(s) are optionally unsaturated.

4. The insulation layer of claim 1, wherein the LDPE is an LDPE homopolymer.

5. The insulation layer of claim 1, wherein the polymer composition is non crosslinked.

6. The insulation layer of claim 1, wherein the polymer composition has a strain below 30% after 20 min, when measured in accordance with DMA method A as described under "Determination methods".

7. A cable comprising one or more conductors surrounded by at least an insulation layer, wherein said insulation layer is as defined in claim 1.

8. The cable of claim 7, wherein the cable is a power cable.

9. A process for producing a cable, comprising:
   applying on a conductor, at least an insulation layer, wherein the insulation layer is as defined in claim 1.

10. A method of manufacturing an insulation layer in a cable comprising, using an insulation layer as defined in claim 1 to produce the insulation layer in a cable.

* * * * *